Sept. 26, 1939.   J. H. DORAN   2,174,380
METHOD OF MAKING ELASTIC FLUID TURBINES
Filed April 1, 1938
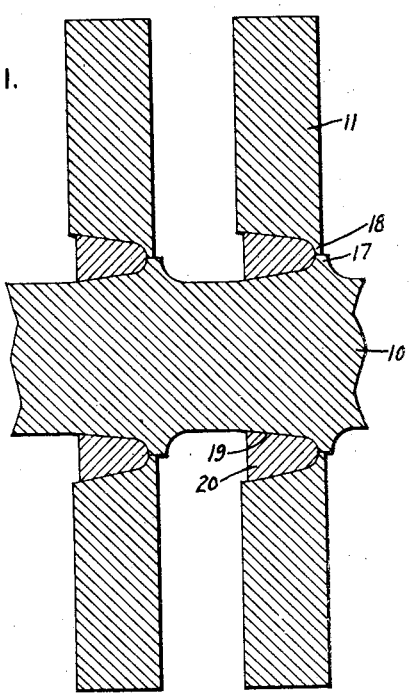
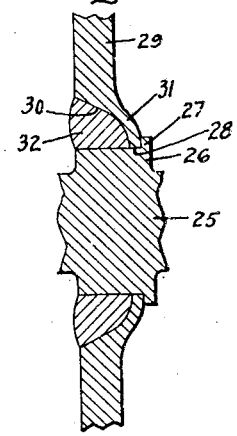
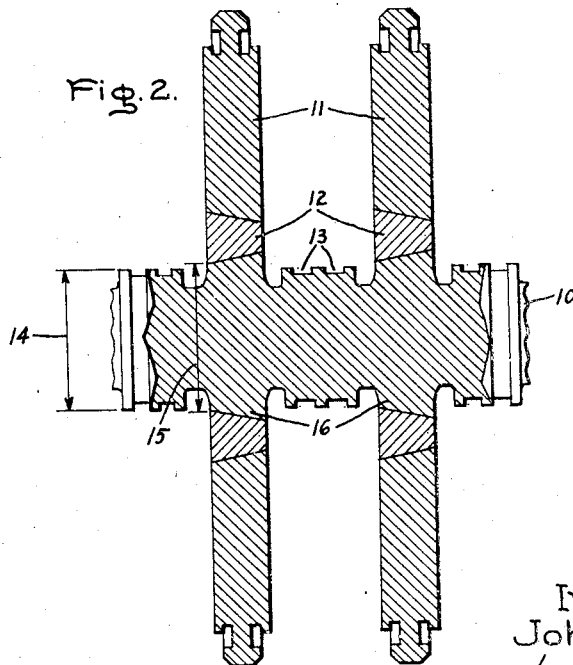
Inventor:
John H. Doran,
by Harry E. Dunham
His Attorney.

Patented Sept. 26, 1939

2,174,380

UNITED STATES PATENT OFFICE 2,174,380

METHOD OF MAKING ELASTIC FLUID TURBINES

John H. Doran, Scotia, N. Y., assignor to General Electric Company, a corporation of New York Application April 1, 1938, Serial No. 199,466

4 Claims. (Cl. 29—156.8)

The present invention relates to elastic fluid turbines, more specifically to methods of making welded turbine rotors.

The general object of my invention is to provide an improved method of making welded turbine rotors whereby stresses in the shaft portion of such rotor are reduced to a minimum.

For a consideration of what I believe to be novel and my invention, attention is directed to the following description and the claims appended thereto in connection with the accompanying drawing.

In the drawing, Figs. 1 and 2 illustrate an elastic fluid turbine rotor in different stages of manufacture in accordance with my invention and Fig. 3 shows a modification of my invention.

The finished rotor as shown in Fig. 2 comprises a shaft 10 with a plurality of bucket wheel disks 11 secured thereto by welds 12. The shaft portions intermediate the disks are machined to form packing grooves 13. The diameter 14 of the shaft proper is smaller than the smallest diameter 15 of the welds 12. This is an important feature of my invention because the shaft proper with the diameter 14 is thereby kept free from stresses set up during the manufacture of the welds 12. The welds 12 actually are formed between annular projections or collars 16 of the shaft and the adjacent surfaces of the bucket wheel disks 11. If any stresses are set up during the welding operation, such stresses are set up in the projections or collars 16, that is, outside the shaft proper with the diameter 14. The rim of each disk is machined to receive bucket blades (not shown).

During manufacture of such welded rotor structure I form a shaft 10, as shown in Fig. 1, with a plurality of axially spaced projections or auxiliary collars 17. This shaft is assembled with unfinished disks 11 each having inner annular projections 18 on one side engaging the aforementioned projections 17. The adjacent surfaces of the disks 11 and the shaft 10 form large grooves 19 which subsequently are filled with welding material 20. The projections 17 and 18 serve as centering surfaces for the disks 11 and at the same time as backing for the welding material 20. After the disks 11 have thus been welded to the shaft 10, the structure is machined, that is, the shaft intermediate the adjacent disks is provided with packing grooves 13, shown in Fig. 2, and the surfaces of the disks and the end portions of the weld, as well as the projections 18, 17, are removed to assure a perfectly sound welding connection between the shaft and the disk.

The modification of my invention, as shown in Fig. 3, comprises a shaft 25 which has a collar 26 with a projection 27 forming a shoulder 28 at one end of the collar. The outer surface of the collar is considerably radially spaced from the shaft surface of the shaft, that is, from the shaft proper, the diameter of the collar 26 being preferably about two inches longer than the diameter of the shaft 25. During manufacture the shoulder 28 on the collar is engaged by a disk 29 which forms a bore 30 and has a wall portion 31 on one side of the bore projecting radially inward and at the same time laterally outward, that is, away from the disk. This wall portion or projection 31 engages the shoulder 28. The groove formed between the bore of the disk and the outer surface of the collar 26 is filled with welding material 32. After the disks and the shaft have thus been welded together, the structure is machined into its final shape, similar to that shown in Fig. 2.

The method and arrangement illustrated in Fig. 3 permit the use of thinner disks and also assures a more certain weld because the first layer of welding material is laid against the thin wall portion 31.

The first layer of welding material is the most difficult one to make on any welded joint. Much depends upon it because if a crack should start it must be cut out before any more weld can be laid in. The first layer also shrinks more than subsequent layers. It therefore tends to pull the two surfaces being joined together more than a subsequent layer, and consequently special precaution must be taken to make the metal surfaces being joined in such a way that the shrinkage can take place with a minimum stress. This is accomplished in the arrangement of Fig. 3 because the long thin projecting wall portion 31 bends very easily.

What I claim as new and desire to secure by Letters Patent of the United States is:

1. The method of making a welded turbine rotor comprising forming a shaft with a plurality of axially spaced annular projections, assembling with the shaft a plurality of disks each having an annular projection centered on a projection of the shaft and forming a large groove with the shaft, filling the grooves with welding material, and removing at least one of the projections and some of the welding material near said projections.

2. The method of making a welded turbine rotor comprising forming a shaft with a plurality of axially spaced annular projections; assembling with the shaft a plurality of disks each having an annular projection centered on a projection of the shaft and forming a large groove with the shaft, filling the grooves with welding material, machining the sides of the disks to an extent that the projections of the disk and the shaft are removed.

3. The method of making a welded turbine rotor comprising forming a shaft with a plurality of intermediate axially spaced annular projections, assembling with the shaft a plurality of disks each forming a groove with the shaft and having an annular projection centered on a projection of the shaft, filling the grooves with welding material, and machining the shaft intermediate adjacent disks so that the diameter of the shaft intermediate the disks is smaller than the smallest diameter of the welded portions.

4. The method of making a welded turbine rotor comprising forming a shaft with a collar having a projection forming a shoulder, assembling with the shaft a disk having a bore with a wall portion at one end thereof projecting radially inward and laterally outward with the end of the portion seated against said shoulder, the bore and the outer surface of the collar forming a large groove, filling the groove with welding material, and machining away the projecting wall portion.

JOHN H. DORAN.